United States Patent [19]

Muller, Jr.

[11] 4,074,836

[45] Feb. 21, 1978

[54] APPARATUS FOR DISTRIBUTING SOLID PARTICLES INTO A VERTICAL VESSEL

[75] Inventor: Karl A. Muller, Jr., Naperville, Ill.

[73] Assignee: Standard Oil Company (Indiana), Chicago, Ill.

[21] Appl. No.: 725,518

[22] Filed: Sept. 22, 1976

[51] Int. Cl.² .................................................. B67D 3/00
[52] U.S. Cl. ................................... 222/564; 141/392
[58] Field of Search ................. 141/93, 285, 286, 392, 141/67; 222/564–575, 173, 195, 470, 460, 464, 414; 214/17 C; 221/464; 302/56, 61, 63, 60; 239/502, 590

[56] References Cited

U.S. PATENT DOCUMENTS 3,867,969  2/1975  Garnett .............................. 141/286

Primary Examiner—Houston S. Bell, Jr.
Attorney, Agent, or Firm—James L. Wilson; Arthur G. Gilkes; William T. McClain

[57] ABSTRACT

The apparatus comprises a distributing means for distributing solid particles into a vessel, a particle entry duct having an inlet end at its top and an outlet end at its bottom, and a flexible connecting means for connecting the particle entry duct to the distributing means. The top of the connecting means is attached to the particle entry duct at a point along the axis of the particle entry duct and the bottom of the connecting means is attached to the distributing means at a point where the center of gravity of the distributing means is located. The length of the connecting means is such that the bottom of the particle entry duct is on the same level as the top of the distributing means or below the top of the distributing means and the elements of the apparatus are positioned such that the periphery of the particle entry duct falls within the periphery of the top of the distributing means. Any suitable particle distributing means may be employed.

4 Claims, 4 Drawing Figures

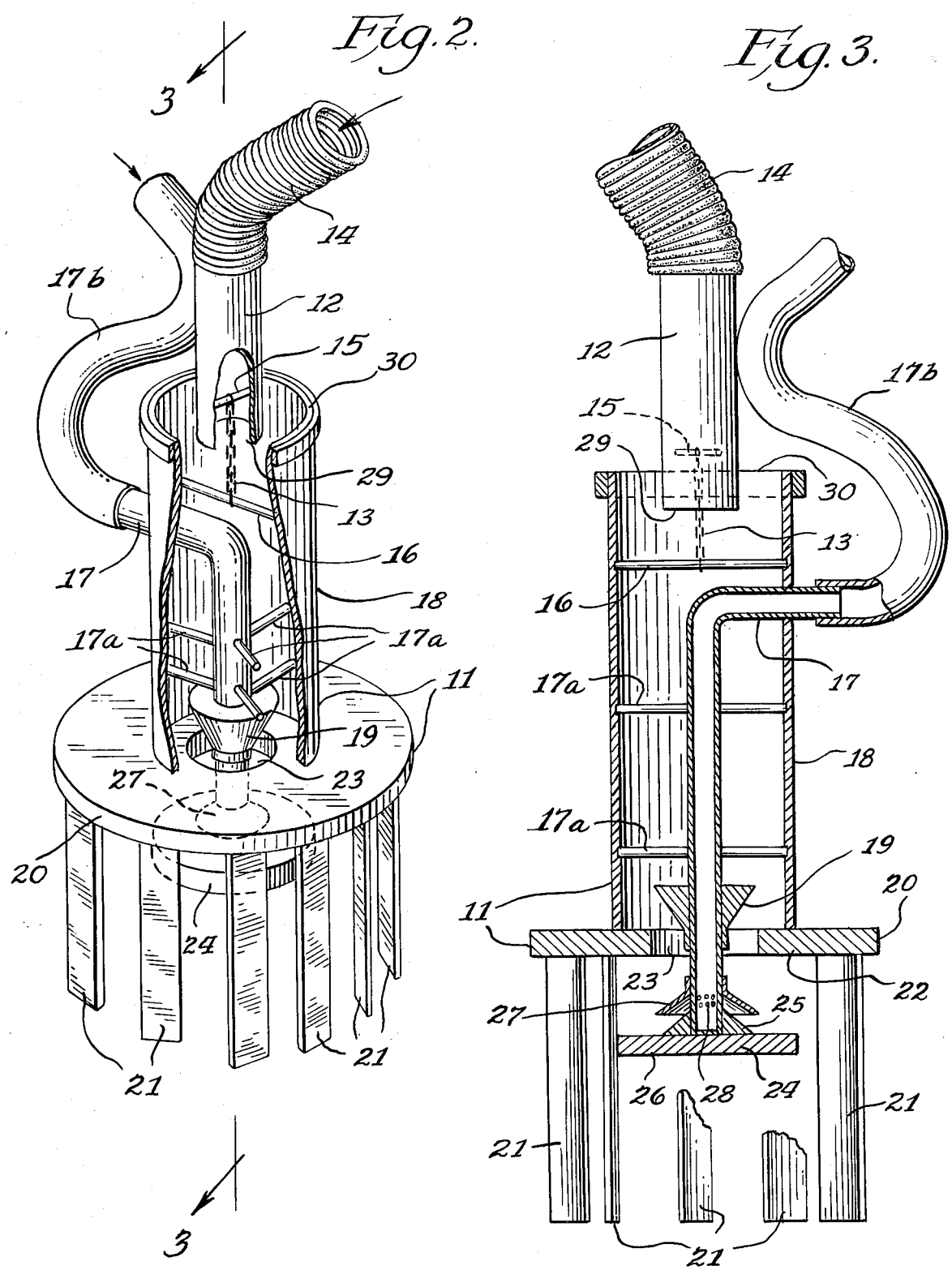

APPARATUS FOR DISTRIBUTING SOLID PARTICLES INTO A VERTICAL VESSEL

BACKGROUND OF THE INVENTION

Small solid particles may be changed or loaded into a vertical vessel to form within the vessel single or multiple beds of such particles. For example, solid adsorbents or packing may be charged to a column or solid catalysts may be changed to a reactor.

Formerly, such solid materials have been charged to a particular vessel by such methods as loading buckets, pouring, or the "sock" method. By this "sock" method, a hopper containing the solid particles is connected to the vessel to be charged by an attached hose, which hose extends down into the reactor near its bottom or to the surface of the solid particles being introduced into the vessel. The solid particles are released from the bottom of the hose by slowly elevating the hose. The bed of solid particles that is formed in the vessel develops a cone at its upper surface. As the solid particles are loaded into the vessel, the bed of solid particles is more or less uniformly distributed over the cross-sectional area of the vessel by raking. By this method of loading solid particles, such as catalyst particles, voids will inherently form in the bed as it is produced in the vessel. Such voids result in non-uniform bed densities. The cone can be avoided by having a man slowly guide the bottom of the hose or "sock" and uniformly fill the reactor; however, non-uniform densities still occur.

Subsequently, small solid particles have been charged to various vessels by means of a catalyst or particle loading device or apparatus, such as the apparatus described in U.S. Pat. No. 3,854,637. For such an apparatus to provide a more uniform bed of solid particles, the distributing plate or baffle at the bottom of the apparatus must remain horizontal. If it does not, non-uniformity of the particle bed will develop.

It has now been found that the apparatus for loading solid particles into a vertical vessel, whatever the apparatus may be, will be maintained in such a position that its distributing plate or baffle will remain in a horizontal position, if the apparatus that is described hereinafter is employed.

SUMMARY OF THE INVENTION

According to the present invention, there is provided an improved apparatus for distributing solid particles into a vertical vessel when said solid particles are being loaded into the vessel, which apparatus comprises a distributing means for distributing the solid particles into the vessel, a particle entry duct having an inlet end at its top and an outlet end at its bottom, and a flexible connecting means for connecting the particle entry duct to the distributing means, the top of said connecting means being attached to the particle entry duct at a point along the axis of said particle entry duct and the bottom of said connecting means being attached to the distributing means at a point where the center of gravity of the distributing means is located, the length of the connecting means being such that the bottom of the particle entry duct is on the same level as the top of the distributing means or below the top of the distributing means and the elements of the apparatus being positioned such that the periphery of the particle entry duct falls within the periphery of the top of the distributing means. An example of the flexible connecting means is a chain.

BRIEF DESCRIPTION OF THE DRAWINGS

Accompanying

FIG. 2 presents an isometric view of an embodiment of the improved apparatus of the present invention. Included in this FIG. 2 is an embodiment of a particle distributing means that is presented in FIGS. 10 and 11 of U.S. Pat. No. 3,854,637 and described in that patent.

FIG. 3 is a cross-sectional view of the embodiment depicted in FIG. 2 as seen along line 3—3.

DESCRIPTION OF THE INVENTION

Figure 1:
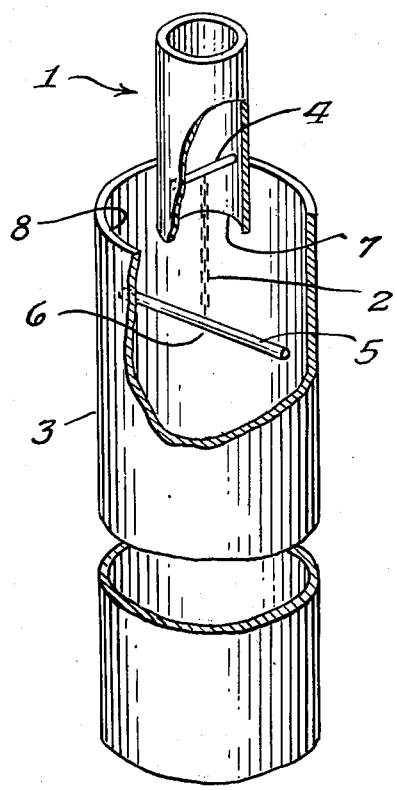
FIG. 1 presents an isometric view of a broad embodiment of the improved apparatus of the present invention.

According to the present invention, there is provided an improved apparatus for distributing solid particles into a vertical vessel when the solid particles are being loaded into that particular vessel. This improved apparatus enables the particular distributing means, which may have as a component a particle distributing plate or baffle at its lower end, to remain level. As a result, the particle distributing plate or baffle remains in a horizontal position.

If the catalyst or particle distributing means were not in a position whereby such catalyst or particle distributing plate is in a horizontal position, the bed of particles that is forming as a result of the unlevel catalyst distributing means will not be a completely uniform bed. Consequently, the bed of particles will not have the maximum density that can be obtained when loading the particles in a vertical vessel. Of course, such uneven and non-uniform particle loading will result in by-passing in the bed of particles when reactants pass therethrough. The improved apparatus of the present invention minimizes the opportunity for obtaining a non-uniform or a less-dense bed of particles.

There are at this time various distributing means for distributing solid particles into a vertical vessel when the solid particles are being loaded into the vessel. An example of these is the apparatus that is described and claimed in U.S. Pat. No. 3,854,637. The apparatus disclosed and described therein may be suitably used as the distributing means of the improved apparatus of the present invention. In view of this, U.S. Pat. No. 3,854,637, which was granted on Dec. 17, 1974, is incorporated by reference herein.

According to the present invention, there is provided an improved apparatus for distributing solid particles into a vertical vessel when said solid particles are being loaded into said vessel, which apparatus comprises as elements: (1) a distributing means for distributing said solid particles into said vessel, (2) a particle entry duct having an inlet end at its top and an outlet end at its bottom, and (3) a flexible connecting means for connecting said particle entry duct to said distributing means, the top of said connecting means being attached to said particle entry duct at a point along the axis of said particle entry duct and the bottom of said connecting means being attached to said distributing means at a point where the center of gravity of said distributing means is located, the length of said connecting means being such that the bottom of said particle entry duct is on the same level as the top of said distributing means or below the top of said distributing means and the elements of said apparatus being positioned such that the periphery of the particle entry duct falls within the periphery of the top of said distributing means.

Various flexible connecting means are contemplated to fall within the scope of the present invention. Examples of a flexible connecting means are (1) a chain and (2) a device which comprises a rod having at each end thereof a rotatable coupling means, said rotatable coupling means permitting that which is connected to said connecting means at its end to rotate about that end to which it is coupled.

An embodiment of the improved apparatus of the present invention is depicted in FIG. 1. This apparatus comprises a particle entry duct 1, a flexible connecting means 2, and a distributing means 3 for distributing the solid particles into the vessel. The flexible connecting means 2 has its top end connected to a point along the axis of the particle entry duct 1 by means of a rod 4. The bottom end of flexible connecting means 2 is connected to distributing means 3 by way of connecting rod 5. The positioning of connecting rod 5 is very important. It must be located such that the junction point 6 of the flexible connecting means 2 and the connecting rod 5 is near the center of gravity of distributing means 3.

The bottom end 7 of particle entry duct 1 is positioned such that it is on a level or somewhat below the top end 8 of distributing means 3. When this particular apparatus is used to charge or load small solid particles to a vertical vessel, even if the axis of particle entry duct 1 is not in a vertical position, the axis of distributing means 3 will remain in a vertical position such that the horizontal distributing plate or baffle located in distributing means 3 will remain in a horizontal position.

The improved apparatus may be used conveniently by attaching a flexible tube or canvas "sock" to the top of catalyst entry duct 1 so that the particles flow from the "sock" through particle entry duct 1 into particle distributing means 3.

An embodiment of the improved particle distributing device of the present invention is presented in FIGS. 2 and 3. This embodiment comprises a distributing means 11, a particle entry duct 12, and a flexible connecting means 13. A flexible tube or "sock" 14 is connected to the top of particle entry duct 12. Flexible connecting means 13, in this instance a chain, is suspended from particle entry duct 12 by means of a rod 15, which extends from one side of particle entry duct 12 to the opposite side. The bottom of connecting means 13 is attached to rod 16 near the geometric center of rod 16. Rod 16 is, in turn, connected to distributing means 11.

In distributing means 11, gas pipe 17 has a 90° bend and extends down through and out of cylinder 18. The gas pipe 17 is centered and held firmly by braces 17a. Air is a suitable gas for use in gas pipe 17. Flexible tubing 17b is connected to gas pipe 17. This very flexible tubing 17b may be a latex tubing, which is strengthened with fiberglass reinforced tape, or Tygon tubing. Flexible tubing 17b, which joins gas pipe 17 to a suitable source of gas, may be connected by a suitable means to particle entry duct 12 or the flexible tubing or "sock" 14.

An inverted conical baffle 19 is located co-axially with gas pipe 17 near the outlet end of cylinder 18. Support 20 is connected to the outlet end of cylinder 18 and has extending from its lower surface a plurality of deflecting vanes 12. Some of these deflecting vanes 21 are broken away for clarity in FIG. 3. Support 20 extends inwardly so that a ledge 22 is present at the bottom of cylinder 18. Inverted conical baffle 19, which may be made from a solid material or from a sheet material, is adjustable up or down so that the space 23 between it and the ledge 22 can be regulated to control the amount of solid particles passing through space 23. Gas pipe 17 has connected at its lower end of second baffle means 24. This second baffle means 24 is composed of a conical section 25 and a plate section 26. Slip collar 27 or sleeve 27 is shaped at an angle so that it is parallel to the upper surface of conical section 25. In this embodiment, gas passing through pipe 17 is passed from pipe 17 through holes 28 and is directed downwardly through the channel formed by the top of conical section 25 and the bottom of collar or sleeve 27. This gas is deflected by the upper surface of plate section 26 outwardly away from the axis of cylinder 18.

In the use of the above-described embodiment, particles pass down through "sock" 14 and particle entry duct 12 into the top of particle distributing means 11. The particles descend through cylinder 18 of distributing means 11 to by-pass inverted conical baffle 19 and pass through space 23 of support 20. Gas being emitted from holes 28 contacts the particles falling through the distributing means 11 and from space 23 and directs them toward deflecting vanes 21, upon which they impinge and subsequently fall to the bed of particles being formed below.

Please note that the length of flexible connecting means 13 is such that the bottom 29 of particle entry duct 12 is not located above the top 30 of particle distributing means 11.

It is to be understood that in the above embodiment, the type of particle distributing means is not critical. Any other distributing means is usable. For example, the device for distributing the particles that is presented in the embodiment depicted in FIG. 4 is suitable.

Figure 4:
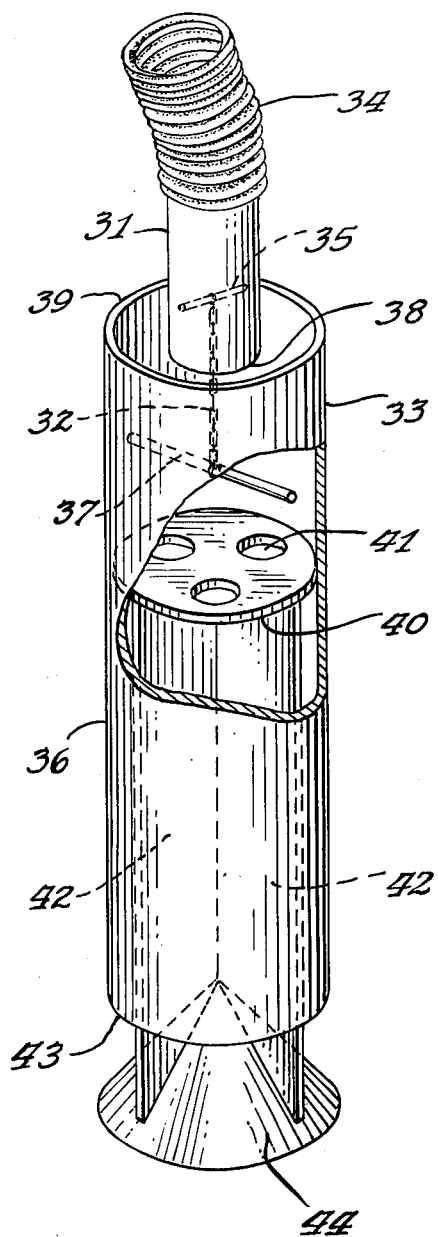
FIG. 4 represents an isometric view of an embodiment of the improved apparatus of the present invention. This FIG. 4 includes a different embodiment of a particle distributing means.

FIG. 4 is an isometric view of another embodiment of the particle loader of the present invention. In this embodiment, the improved loader comprises a particle entry duct 31, a flexible connecting means 32, and a particle distributing means 33. The top of the particle entry duct 31 is connected to the bottom of "sock" 34. Flexible connecting means 32 is suspended from particle entry duct 31 by means of rod 35, which is connected to opposite walls of particle entry duct 31. Flexible connecting means 32 is connected to cylinder 36 of particle distributing means 33 by means of rod 37, which is attached to opposite walls of cylinder 36. The length of flexible connecting means 32 is such that the bottom 38 of particle entry duct 31 is located on or below the same horizontal plane as the top 39 of the particle distributing means 33. Within the cylinder 36 and below rod 37 is located a perforated plate 40, which is positioned perpendicular to the axis of cylinder 36. This perforated plate 40 has three holes 41 positioned in such a manner that each of the holes 41 is located above a space formed by the wall of the cylinder 36 and two of the baffles 42, which are parallel to the axis of cylinder 36 and are joined to each other along the axis of cylinder 36 at an angle of 120 degrees. Hence, there are three of such baffles 42. They extend from the bottom 43 of cylinder 36 and are connected to the upper surface of conical baffle 44.

In the use of this latter embodiment of the apparatus of the present invention, particles are passed through "sock" 34 and particle entry duct 31 and into cylinder 36 of the particle distributing means 33. The particles pass through the three holes 41 of perforated plate 40, which controls the flow of particles through particle distributing means 33. The particles pass through the remainder of cylinder 36 to impinge on the surface of conical baffle 44 to be sprayed away from the surface and fall below the apparatus. Not shown in this embodiment are deflecting vanes. However, such deflecting vanes as those provided in the embodiment presented in FIGS. 2 and 3 hereinabove could be used to great advantage in this embodiment of FIG. 4.

In each of the above embodiments, whether the particle entry duct is held vertically is immaterial. The particle distributing means in any case will remain vertical so that any plate or baffle that should be in a horizontal position will be in a horizontal position. This will result in the particle distributing means being used properly and in a manner that will promote the most distribution of particles.

Please note that the above examples are presented for purposes of illustration only and are not intended to limit the scope of the present invention.

It can be seen that the improvement of the present invention comprises a particle entry duct having an inlet end at its top and an outlet end at its bottom and a flexible connecting means for connecting said particle entry duct to the distributing means described hereinabove, the top of the connecting means being attached to the particle entry duct at a point along the axis of the particle entry duct and in a manner such that the periphery of the bottom of said particle entry duct is positioned within the periphery of the top of said distributing means and the length of said connecting means is such that the bottom of said particle entry duct is on the same level or below the top of said distributing means.

What is claimed is:

1. In an improved apparatus for distributing solid particles into a vertical vessel when said solid particles are being loaded into said vessel, which apparatus comprises a distributing means for distributing said solid particles into said vertical vessel, said distributing means having an inlet for said solid particles at its top, the improvement which comprises a particle entry duct having an inlet end at its top and an outlet end at its bottom and a flexible connecting means for connecting said particle entry duct to said distributing means, the top of said connecting means being attached to said particle entry duct at a point along the axis of said particle entry duct and the bottom of said connecting means being attached to the distributing means at a point where the center of gravity of the distributing means is located in a manner such that the periphery of the bottom of said particle entry duct is positioned within the periphery of the top of said distributing means, the length of said connecting means being such that the bottom of said particle entry duct is on the same level or below the top of said distributing means.

2. An improved apparatus for distributing solid particles into a vertical vessel when said solid particles are being loaded into said vessel, which apparatus comprises as elements: (1) a distributing means for distributing said solid particles into said vessel, (2) a particle entry duct having an inlet end at its top and an outlet end at its bottom, and (3) a flexible connecting means for connecting said particle entry duct to said distributing means, the top of said connecting means being attached to said particle entry duct at a point along the axis of said particle entry duct and the bottom of said connecting means being attached to said distributing means at a point where the center of gravity of said distributing means is located, the length of said connecting means being such that the bottom of said particle entry duct is on the same level as the top of said distributing means or below the top of said distributing means and the elements of said apparatus being positioned such that the periphery of the particle entry duct falls within the periphery of the top of said distributing means.

3. The apparatus of claim 2 wherein said flexible connecting means is a chain.

4. The apparatus of claim 2 wherein said flexible connecting means comprises a rod having at each end thereof a rotatable coupling means, said rotatable coupling means permitting that which is connected to said connecting means at its end to rotate about that end to which it is coupled.

* * * * *

UNITED STATES PATENT OFFICE
CERTIFICATE OF CORRECTION

Patent No. 4,074,836            Dated February 21, 1978

Inventor(s)    Karl A. Muller, Jr.

It is certified that error appears in the above-identified patent and that said Letters Patent are hereby corrected as shown below:

| | |
|---|---|
| Column 1, line 6, | "may be changed" should be -- may be charged -- |
| Column 1, line 10, | "may be changed" should be -- may be charged -- |
| Column 3, lines 31-32, | "the horizontal" should be -- any horizontal -- |
| Column 3, line 66, | "vanes 12." should be -- vanes 21. -- |
| Column 5, line 16, | "most distribution" should be -- most uniform distribution -- |

Signed and Sealed this

Twenty-third Day of October 1979

[SEAL]

Attest:

RUTH C. MASON
*Attesting Officer*

LUTRELLE F. PARKER
*Acting Commissioner of Patents and Trademarks*